July 18, 1939.  R. H. TWINING  2,166,225
PROCESS AND APPARATUS FOR PREPARING ACTIVATED CARBON
Filed April 2, 1937
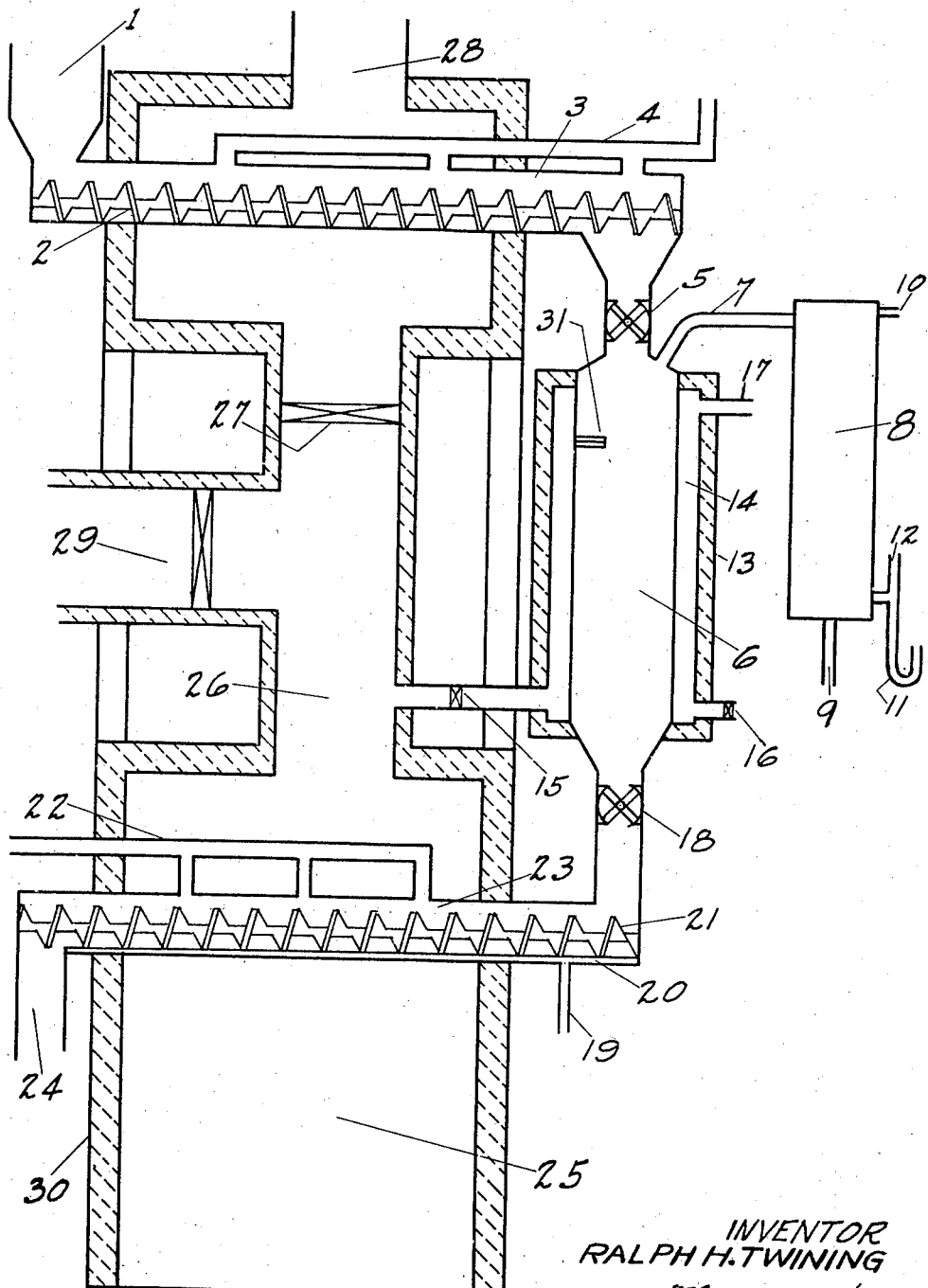
INVENTOR
RALPH H. TWINING
BY
ATTORNEY Patented July 18, 1939

2,166,225

UNITED STATES PATENT OFFICE 2,166,225

PROCESS AND APPARATUS FOR PREPARING ACTIVATED CARBON

Ralph H. Twining, Arden, Del., assignor to Darco Corporation, Wilmington, Del., a corporation of Delaware Application April 2, 1937, Serial No. 134,531

4 Claims. (Cl. 252—3)

The invention relates to an improved process for the manufacture of activated carbon and to the apparatus therefor. More particularly, it relates to a continuous process for the manufacture of activated carbon from wood or similar cellulosic material.

Heretofore, it has been the practice to use commercial charcoal as a carbonaceous material for the production of activated carbon with little regard to the conditions under which the distillation was carried out. This involved a waste of heat since the charcoal was usually cooled down after manufacture and was later heated in the activating process. Moreover, the cooling down allowed the pores of the wood charcoal to sorb tar vapor, thus clogging them with condensed tar, and allowed this tar to oxidize, accompanied by polymerization and condensation producing a hard resinous material which is exceedingly detrimental to the process of activation.

An object of this invention is to produce a superior activated carbon from wood by a new continuous process with recovery of all valuable by-products in condition for the most economic utilization.

Another object of this invention is to devise a new apparatus adapted for the continuous manufacture of activated carbon directly from wood in three individually controlled steps, namely, predrying of the wood, carbonization of the pre-dried wood, and activation of the charcoal so produced.

Another object of this invention is to produce activated carbon which is superior to prior activated carbons and which is especially adapted for use in the purification of aqueous mediums, such as drinking water.

Another object of this invention is to produce an activated carbon having a much higher activity than prior activated carbon, as measured by phenol adsorption.

Other objects of this invention will more fully hereinafter appear.

In the commercial production of charcoal, wood is heated in closed retorts, kilns or ovens until all valuable products are driven off. Usually the highest temperature to which the wood is carried is about 400° C. In the first stage of distillation the temperature of the wood remains near 100° C., as free moisture is driven off. Upon removal of all free moisture and endothermic stage begins, during which heat is gradually supplied until the temperature of the wood is raised from 100° C. to about 270° C. At or about 270° C. there is a sudden change to a very vigorous activity and the wood is in the midst of what is known as its exothermic reactions. The wood turns black almost in an instant and large quantities of vapors are driven off. The last material to be driven out of the wood is an oily, resinous substance known as wood tar. At the conclusion of the exothermic reactions when the flow of gas from the retort becomes stagnant, the operator concludes that the retort is "off" and banks the fires preparatory to discharging the charcoal. At this time, however, the charcoal is surrounded by an atmosphere of tar in the vapor phase. A peculiar property of charcoal is that as soon as the temperature stops rising it ceases to give off gas; and, as soon as it ceases to give off gas, it adsorbs the surrounding gas and vapor with great rapidity. Consequently, the drop in temperature before discharging is sufficient to allow the charcoal to adsorb large quantities of the tar vapor, clogging the pores which would otherwise be clean and open. The contents of the retort are then discharged and transferred to sealed containers where they are cooled out of contact with air for 48 hours. This cooling is followed by conditioning in the presence of air for at least 48 hours before loading for shipment. This conditioning is necessitated by the fact that the material is subject to spontaneous combustion, that is, exposure to air causes a rise in temperature not infrequently to the point of ignition. The rise in temperature is due, to a great extent, to the oxidation of the tar content of the charcoal. During this oxidation, accompanied by polymerization and condensation, all the tar in the charcoal is converted to hard, resinous material very difficult to remove even by heating to high temperature. If it is later attempted to activate such charcoal, such attempts result in a carbon of little activity.

It has been proposed to produce activated carbon from wood by so-called continuous processes. However, these processes have not been successful chiefly because they failed to take into consideration certain factors which are shown below to be essential. The exothermic reaction which occurs during the destructive distillation is very difficult to control for several reasons. One of these is the fact that the moisture in the wood requires additional heat to remove it. Hence, when the exothermic reaction starts, the additional heat evolved carries the temperature far above the cracking temperature of the tar with deleterious results to subsequent activation. Another reason is that the exothermic reaction is very violent, frequently almost explosive in force, particularly if instigated by application of external heat.

My invention overcomes the disadvantages attending the prior processes above enumerated, of producing activated carbon from wood, namely, the processes wherein charcoal is formed as an intermediate product and is allowed to cool in the manner described and is then heated up again in an activating process and the processes wherein the hot charcoal is immediately activated. My invention enables the production of large yields of concentrated crude pyroligneous liquor which makes possible low-cost recovery of all by-products, it being well-known in the destructive distillation industry that the more diluted the pyroligneous liquor, the higher the cost of recovering its valuable ingredients. It enables a carefully controlled production of charcoal and of pyroligneous liquor. It enables the production of a relatively tar-free charcoal with open pores which is much more suitable for activation than prior charcoals. It enables the production of charcoal having a tremendously reduced pitch or secondary carbon content. It enables larger yields of better quality activated carbon, and a simple and low cost operation because the process is truly continuous and because of the saving of fuel due to the utilization of the heat liberated by the exothermic reaction of destructive distillation. This invention involves the only known process which continuously gives maximum yields of chemicals in condition for lowest cost of recovery and also produces a greatly improved charcoal for activation and continuously carries out the activation.

In the following description of the invention, a typical process and apparatus to be used in conjunction therewith will be described in some detail. While specific means and process steps will be described, it will be obvious that equivalent means and process steps may be used without departing from the spirit of the invention. In connection with the description, reference is made to the accompanying drawing which portrays a vertical sectional view of a suitable apparatus for carrying out the invention.

There is first selected wood which is comminuted to suitable size. Sawdust, shavings, hogged wood, small mill clippings, or the like, may be used, or whole wood may be reduced to a suitable state of fine division. The wood is placed into a hopper, whence it is continuously fed into and through a pre-drying zone in which the free water is substantially completely removed. The predryer may be heated by any suitable means, as by the waste gas from the activating furnace, to a suitable temperature. Moist wood requires considerable heat for predrying. While the temperatures used in predrying need not and must not be very high (usually around 100–125° C.), a considerable number of B. t. u. must be furnished to dry the wood because of the high latent heat of water. On the contrary, warm, dry wood needs no heat added to bring about its carbonization, but it carbonizes itself and gives off heat. The heat given off is just enough to bring warm, dry wood to carbonization; but not enough to dry the wood if its moisture content is over 1%. It is preferred to predry to a moisture content of ½% or less.

Predrying and carbonizing are done separately, according to this invention. Otherwise the heat that must be furnished to bring about predrying will result in overheating during carbonization with detrimental results. Also, by separation of these steps, dilution of the pyroligneous acid with the water from the wood is prevented. The cost of recovery of chemicals from the pyroligneous acid depends largely upon its concentration, the more concentrated it is the less the recovery cost. Still another reason for separation of these steps is that the sizes of equipment needed for predrying and carbonizing are different. Thus, larger capacity equipment is required for predrying than for carbonizing.

The wood is fed continuously into the predryer which may be heated by any suitable means, such as by the waste gas from the activator. The predryer may be kept under a slight pressure so that the wood is dried in an atmosphere of superheated steam instead of air. Hence, the wood may be dried at a relatively high temperature. This also gives the advantage of minimizing the size of the predryer, of utilizing more effectively the waste gas from the activator, and of introducing the wood to the carbonizer very hot. The temperature of predrying may vary from 100 to 200° C., depending upon the pressure, rate of travel of wood, moisture content, etc. Usually it is preferred to have the wood at a temperature of around 200° C., when it has completed its travel through the predryer and as it is introduced into the carbonizer. The moisture liberated is removed through a pressure regulated valve.

The warm predried wood next enters a carbonizing zone by any suitable means which allows passage of material continuously but which prevents the gases or heat in the predryer from passing into the carbonizing zone and vice versa, and which prevents exposure of the wood to the air. The wood is fed continuously in such quantities that just the right temperature is maintained to keep the reaction going but not enough to raise the temperature to the cracking point of the tar oils. The carbonizer is a closed retort equipped with suitable means for removal of the products of carbonization (destructive distillation), and also preferably with means for thermostatically controlling the temperature of the wood undergoing carbonization. This latter means may comprise a thermostat connected to suitable cold air and hot gas sources, and is so adjusted as to control the temperature of the retort very rapidly and within very close limits. The most important factor in the process is the proper control of temperature during carbonization. If it is allowed to rise too high, the charcoal is difficult if not impossible to activate. The lower the temperature of carbonization is maintained, the better is the yield and quality of the pyroligneous acid and the better is the activated carbon produced. In practice, it is maintained as close to 300° C. as is possible.

As will thus be apparent, the wood is predried and carbonized without any substantial contact with air or other oxidizing gas.

The lowest temperature at which destructive distillation (carbonization) of wood takes place is 270° C. However, in carrying out my process, I have found that 300–400° C. in the carbonizing zone is about the lowest working temperature which is practical for large scale operation. The object is to remain as near the temperature of 300° C. as possible. At this temperature the exothermic reaction is not very strong and it might be stopped altogether if the operator should happen to let in too much cold air. In this case, however, the pyrometer would immediately warn of the danger and as a remedy, but only as an emergency measure, hot gas could be admitted. However, it should be understood that heat is not used in destructive distillation but rather cooling is used. The arrangement is made for adding heat in order to maintain exactly the right temperature in case cooling is overdone. It is highly preferred, however, to utilize an automatic thermostatic control for the cold air and hot gas so as to provide against such difficulties. Such a control automatically supplies the correct amount of cooling or heating gas of the correct temperature and easily controls the temperature of the wood undergoing distillation (carbonization) for optimum results. The hot gases supplied in this manner may come from the waste hot gases from the activator, as previously indicated. The heated gases from the cooling of the carbonizing retort may be utilized in any suitable manner to recover the heat contained therein, as for example to predry the wood, to heat water to be used in forming steam for activation, etc.

The wood is maintained in the carbonizer until it is completely transformed into charcoal and is free from any distillable products. As a result of the careful temperature control, the process delivers from the distillation retort chemicals in maximum yields at maximum concentration and charcoal truly tar-free and open-pored to the activating unit. Furthermore, the charcoal is delivered continuously and hot to the activating unit. The cost of conditioning and handling charcoal so that it may be exposed to the air with safety is high. All this expense is avoided with this process. Even the heat of the hot charcoal is saved, no inconsiderable item.

The hot charcoal thus formed is discharged into an activating zone through means which prevent contact with the air or intercommunication of gases or heat between the carbonizing zone and the activating zone. An important feature is that the activating zone receives the charcoal hot as it comes from the carbonizing zone which results not only in a great saving of heat in activation but also eliminates the costly and disadvantageous cooling, conditioning and handling of the charcoal referred to above.

The activation temperature will be around 1000° C. to 1100° C. The activator is preferably heated externally by means of a combustion chamber. Steam or other activating gas is passed in so as to substantially fill the space not occupied by the carbon and to provide a bath of steam for each particle of carbon. The steam may be under pressure if desired, in which case the discharge outlet for the activated carbon is provided with a gas-tight valve of suitable character. The activating gas preferably moves countercurrently to the carbon undergoing activation. Activation of this specially prepared charcoal is much cheaper than for ordinary charcoal. Less heat is required, less time of exposure to the activating gases is needed. Higher yields and a greater degree of activity result.

The carbonizing and activating units are separated because of the great differences in conditions of carbonization and activation. A combining of these units would not result in a thorough or efficient carbonization or activation. The activation temperature is so far above carbonization that it would be most harmful to allow the high temperature gases from activation to pass into the carbonizing zone, and this would result in overheating, lack of control, loss of pyroligneous acid, poor carbon, etc.

The disposal of the units which I have described carries out the aims of the invention with a low first cost of equipment, low operating cost, unusually high yields of wood by-products, and an exceptionally high grade of activated carbon.

The activator preferably passes the carbon continuously from one end to the other and utilizes external heat from the combustion of suitable fuel, and internal steam, as described. Any suitable type of activating furnace may be used, but it is highly preferred to use steam as the sole activating means. The activator is so arranged that the gases used to heat it may pass around the predryer or the carbonizing retort, as previously referred to, in order to economize upon heat. Their passage is governed by suitably arranged gates, more fully described below.

The resulting activated carbon is preferably removed from the activator by suitable means preventing release of the steam activating agent. It may be quenched by dumping in cold water and allowing to remain there until thoroughly cooled with later drying and grinding as desired.

Referring now to the accompanying drawing, 1 represents the hopper in which the initial undried or wet wood is placed. It is then conveyed by worm 2 into the predryer 3. The worm is shown as not taking up all the space in the dryer, but the arrangement is such that predryer is sealed so as to maintain a desired steam pressure therein by suitable sealing means (not shown) at the left of the predryer and an exit valve (not shown) at the right or outlet end of the predryer controlled by a pressure regulator. The gases from the drying, consisting essentially of steam, pass through pipes indicated generally by 4 to the exit end of the predryer. The predryer is heated by gases from around the activator 23 which pass upwardly through gate 27. As the wood reaches the right-hand side of the predryer, it contains virtually no moisture and is at a temperature of 125 to 200° C. It then passes downwardly through barrel valve 5 which rotates continuously at a suitable speed in such a manner as to allow passage of wood into carbonizer 6 but does not allow gaseous communication between the predryer 3 and the carbonizer 6. Carbonizer 6 has outlet means 7 for discharging the vapors arising from the destructive distillation of the wood. Outlet means 7 discharge the vapors into a condenser 8, which is cooled by cold water entering at 9 and being discharged at 10 as hot water which may be used for any desired purpose, such as to make activating steam. The condensed pyroligneous acid collects in pipe 11, while the uncondensed wood gas is passed outwardly and upwardly through pipe 12 and utilized in any desired manner. The carbonizer 6 is a steel, cylindrical retort in a brick setting 13 with a hollow space 14 between the brick and the steel. There is provided a thermostat 31 within the carbonizer (at the carbonizing zone) which is so connected to hot gas valve 15 and to cold air valve 16 as to increase the opening of valve 16 and at the same time to decrease the opening of valve 15 upon an elevation of the temperature within the carbonizing zone above the predetermined optimum point described above, and to decrease the opening of valve 16 and at the same time to increase the opening of valve 15 upon a decrease of the temperature in the carbonizing zone below the predetermined optimum point. Pyrometers (not shown) may, if desired, be connected to suitable points in the carbonizer, including one at the point where the thermostat is situated. A suitable exhaust fan (not shown) is connected to the exit end 17 of the retort jacket or hollow space 14, to thereby induce a draft around the carbonizer whenever either valve 15 or 16 is open. Valves 15 and 16 are arranged, so that as 15 is opened, 16 is closed, and so that as 16 is opened 15 is closed.

The wood passes downwardly through the carbonizer in a continuous manner and initiates its own exothermic carbonizing and destructive distillation reactions which are controlled in the manner described above. As the wood nears the bottom of the carbonizer 6 it will have been transformed into nearly pure charcoal. It then passes continuously through barrel valve 18 into the activator 23. Barrel valve 18 is similar to barrel valve 5 previously described and permits no gases to intercommunicate between the activator 23 and the carbonizer 6 but allows the passage of the hot charcoal from the carbonizer 6 into the activator 23.

Steam is admitted to the activator by means of steam inlet 19. It passes into steam chest 20 which extends the length of the activator and permits the steam to pass upwardly by means of a series of small holes (not shown) preferably extending the full length of the combustion furnace, through the carbon which is being passed to the left by means of worm 21, and to thereby intimately contact the carbon particles. The steam and gases formed by the activation process pass outwardly through pipe 22, which may be provided with a suitable pressure regulating valve (not shown) if desired so as to maintain the activation under pressure.

The activation process will be completed when the carbon has passed all the way to the left where it is discharged through outlet 24 as the final product. If the activator is under pressure, this outlet will be provided with a barrel valve similar to barrel valves 18 and 5 previously described.

The activator 23 is heated externally by a combustion chamber 25. The combustion gases, after passing around activator 23, pass upwardly into passage 26. Thence, they are available for passage to the space 14 around the carbonizer if valve 15 should open. They also pass upwardly through gate 27, which allows them to circulate around the predryer in amount sufficient to predry the wood at the correct temperature. Gate 27 may be thermostatically controlled by means of a thermostat suitably disposed in predryer 3. These gases, after passing around the predryer, pass upwardly and out exit stack 28. The remaining combustion gases pass outwardly to the left through exit 29, whence they may be utilized in any desired manner for recovery of the heat contained in them.

The whole assembly is preferably mounted in a brick setting 30 as shown in the section. The carbonizing retort is preferably disposed, as shown, at the right of the main brick setting in a brick setting 13, at least part of which is individual to it, but the whole assembly may, if desired, be placed in one brick setting which would go straight up on the right side of the carbonizing retort so as to encompass the right ends of the predryer and activator.

The arrangement shown is very convenient, the predryer being placed in the upper portion of the brick setting, over the activating means and combustion chamber, and the carbonizer being disposed so that its charging end is in intimate relation to the discharge end of the predryer and so that its discharge end is in intimate relation to the charging end of the activator.

By the process described, I am able to produce a superior grade of activated carbon, which is highly suited for liquid treatment, such as refining of sugar, purification of drinking water by removal of tastes and odors therefrom, etc. It may be produced with an unusually high phenol adsorptive power, namely, a phenol number over 8.0 and as high, for example, as 11, or higher in the granular form (see Baylis "Elimination of Taste and Odor in Water", 1935, page 197) and a phenol value below 15 and as low, for example, as 11, or lower in the powdered form (Baylis, loc. cit. pp. 182-184).

While specific means and process steps have been described, these are intended only as illustrative and not as limiting the invention, which is to be limited only as defined in the appended claims. In place of admitting cold air around the carbonizing retort, cooling may be effected by any suitable means, such as passing an inert cooling gas such as carbon dioxide or waste flue gases through the wood undergoing distillation or carbonization. The activation may be effected with any suitable gas, including steam, chlorine, carbon dioxide, or even an oxidizing gas such as air, although steam is preferred.

The term "wood" as used in this specification is intended to include equivalent cellulosic material, as for example coconut shells and the like.

In the claims, the term "continuous" is intended to mean a process wherein the material is continually and uninterruptedly moving in all parts of the apparatus as distinguished from an intermittent or batch process.

What is claimed is as follows:

1. Apparatus for the continuous manufacture of activated carbon from cellulosic material comprising, in combination, a predryer, a carbonizer, means for transferring dried cellulosic material from the predryer to the carbonizer and to prevent substantial intercommunication of gases therebetween, means for cooling the carbonizer and maintaining its temperature at not over 400° C., an activator, and means for transferring carbonized cellulosic material from the carbonizer to the activator and to prevent substantial intercommunication of gases therebetween.

2. Apparatus for the continuous manufacture of activated carbon from cellulosic material comprising, in combination, a predryer, a carbonizer, means for transferring dried cellulosic material from the predryer to the carbonizer and to prevent substantial intercommunication of gases therebetween, said carbonizer having means, including a heat exchange surface in contact with a cooling medium, for maintaining its temperature at not over 400° C., means for supplying a cooling medium to the heat exchange surface of the carbonizer, an activator, and means for transferring carbonized cellulosic material from the carbonizer to the activator and to prevent substantial intercommunication of gases therebetween.

3. A continuous process of preparing activated carbon which comprises predrying comminuted cellulosic material to a moisture content of not over 1% in a predrying zone, transferring the hot dried cellulosic material without contact with air and without substantial loss of heat to a carbonizing zone and completely carbonizing it while preventing intercommunication of gases between said predrying zone and said carbonizing zone, transferring the hot charcoal so produced without contact with air and without substantial loss of heat to an activating zone and activating it while preventing intercommunication of gases between said activating zone and said carbonizing zone.

4. A continuous process of preparing activated carbon which comprises predrying comminuted cellulosic material in a predrying zone to a moisture content of not over 1%, transferring the hot dried cellulosic material without contact with air and without substantial loss of heat to a carbonizing zone and completely carbonizing it while preventing the vapors of distillation from contacting the cellulosic material in the predrying zone and while maintaining the material by cooling at a temperature of substantially 300–400° C., transferring the hot charcoal so produced without contact with air and without substantial loss of heat to an activating zone and activating it while preventing intercommunication of gases between said activating zone and said carbonizing zone.

RALPH H. TWINING.